June 28, 1938. H. F. SMITH 2,122,013
REFRIGERATING APPARATUS
Filed Dec. 1, 1933
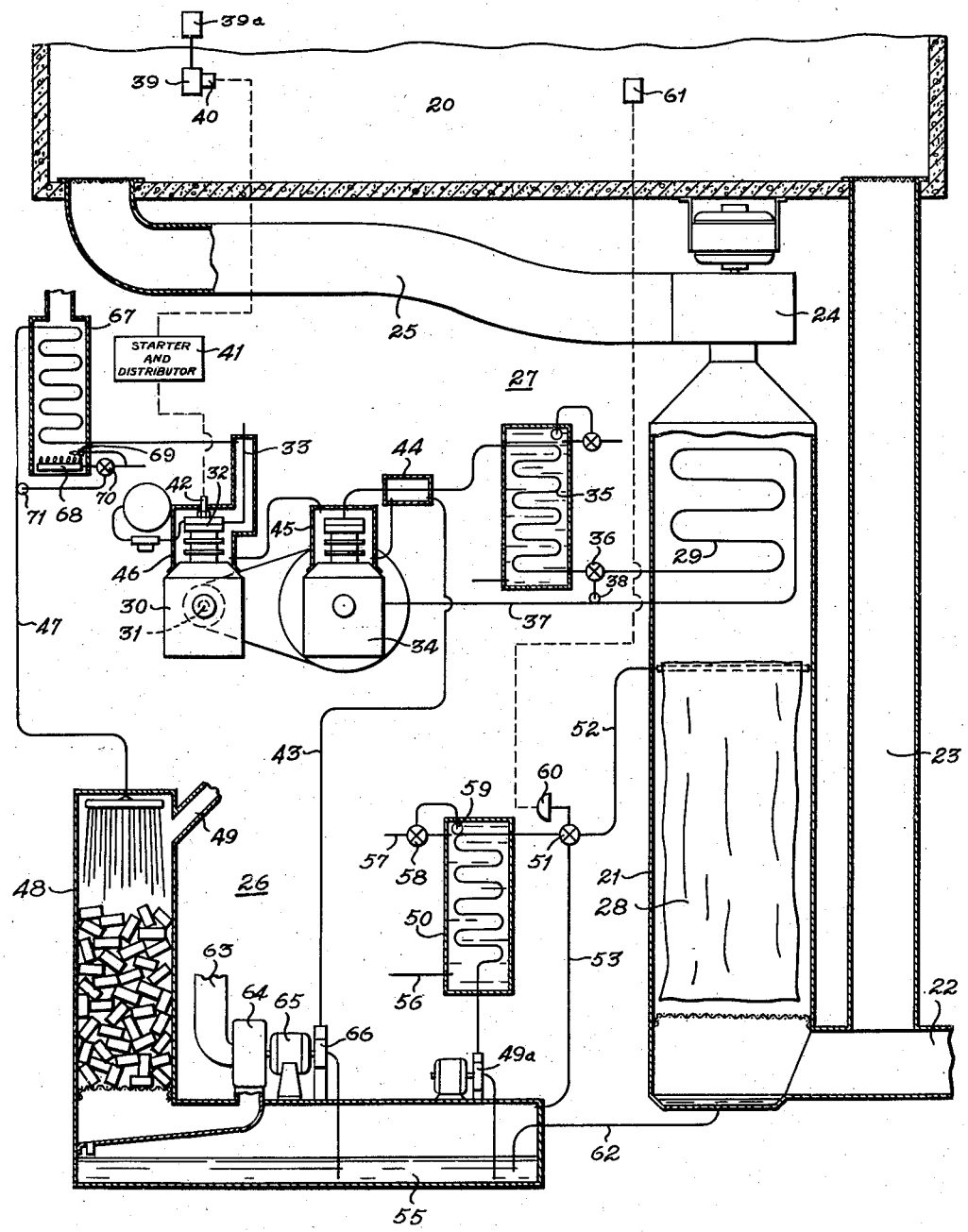

Patented June 28, 1938

2,122,013

UNITED STATES PATENT OFFICE 2,122,013

REFRIGERATING APPARATUS

Harry F. Smith, Dayton, Ohio, assignor to General Motors Corporation, Dayton, Ohio, a corporation of Delaware Application December 1, 1933, Serial No. 700,498

7 Claims. (Cl. 62—6)

This invention relates to a method of apparatus for conditioning a gas, such as air. It is among the objects of this invention to provide a method and apparatus for changing the characteristics of a gas, such as air, by subjecting the gas to a thermal effect of a refrigerating system and to a physical or chemical reaction with an agent which has an affinity for the gas or a portion thereof. The apparatus is so coordinated that the waste energy of the refrigerating system is utilized in reactivating the agent which has an affinity for the gas.

More particularly, it is among the objects of this invention to coordinate a compression refrigeration system with an absorbing system by which the temperature of the gas or air is altered and the moisture is removed therefrom. In this arrangement the waste heat or energy from the compression system and its appurtenances is utilized to reactivate the absorbing agent of the absorption system.

Further objects and advantages of the present invention will be apparent from the following description, reference being had to the accompanying drawing, wherein a preferred form of the present invention is clearly shown.

In the drawing:

The figure shows diagrammatically a preferred embodiment of my invention.

In practicing the embodiment now preferred, the gas, in this case air, has its characteristics changed before it is delivered into an enclosure 20. The characteristics of the air or gas are changed in a chamber 21, into which is introduced fresh air from the outside through a conduit 22, and/or, if desired, air from the enclosure 20 through the return conduit 23. The air, after it has had its characteristics changed, is delivered by the fan 24 through the conduit 25 into the enclosure 20. The air has its characteristics changed by subjecting it to an affinitive medium, which has either a physical or chemical affinity for part or all of the gas. Thus, in this particular embodiment, the air is subjected to the physical or chemical absorbing action of the circulating agent of an absorption or affinitive medium system, generally indicated as 26, and is subjected to a thermal effect of a refrigerating system generally indicated as 27.

As I now prefer to practice the invention, the air is subjected to the drying action of an aqueous solution of one of the lithium halide-like salts, such as lithium chloride, lithium bromide, lithium iodide, or any of the other lithium halide-like salts which have water vapor absorbing characteristics similar to said salts. The air is subjected to this medium in the contactor 28. The air is also subjected to a thermal effect of the refrigerating system 27 by a thermal exchange with an expanding refrigerant in the evaporator 29. Thus the air is dried by the absorbing system 26 and is cooled by the refrigerating system 27. While I have shown the action of these two systems upon the air to take place at different zones, in a particular sequence, and through different mediums, it is to be understood that it is within the purview of my invention that the characteristics of the air or gas may be changed in one or any number of zones, in any sequence and through any number of mediums.

The arrangement and construction is such that the waste energy of the refrigerating system 27 may be utilized to reactivate the absorbing agent of the system 26. Thus the refrigerating power of the system 27 is created by the aid of the transformation of potential energy into kinetic energy with the evolution of heat, and this heat is utilized to reactivate the absorbing medium. This may include the waste energy from the prime mover for the refrigerating system. In the form herein disclosed, this potential energy is transformed into rotary kinetic energy by the explosive transformation of the energy of a fuel. Thus an internal combustion engine 30 is provided in which the energy of a gaseous or liquid fuel is transformed into other forms of energy such as rotary kinetic energy delivered at the shaft 31 and in the form of heat energy delivered at the combustion chamber 32 and the exhaust pipe 33. The internal combustion engine 30 drives a compressor 34 which forwards a volatile refrigerant to a condenser 35 from whence it flows in liquid form and expands into the evaporator 29 through the expansion valve 36 and returns through the pipe 37 to the compressor 34. If desired, the expansion valve 36 is of the well-known thermostatic type which is provided with a thermostatic bulb 38, placed at the outlet of the evaporator 29 in such a manner as to maintain the evaporator 29 in a substantially flooded condition.

The refrigerating effect of the system 27 upon the air is preferably made dependent upon conditions in the air. To this end, a dry bulb thermostat 39, made responsive to temperatures in the enclosure 20 alone or to the combined action of the inside temperature and the outside temperature at 39a, is made effective to start and stop the engine 30 in accordance with temperature conditions in the enclosure 20. One way of accomplishing this is by causing it to open and shut a snap switch 40 which controls the flow of current to the starter and distributor 41 which starts the engine 30 and furnishes ignition current to the spark plugs 42. Starter controls and distributors of this type are well known in the internal combustion engine art and are therefore not further described. It is understood that the starter control energizes the starter as long as necessary until the engine 30 has been properly started after which the current to the starter is automatically stopped. Also it is understood that high tension current is distributed or supplied to the one or more spark plugs 42 at the proper time to maintain the engine 30 in operation as long as the switch 40 is closed.

A portion of the energy of the fuel transformed into other forms of energy in the engine 30 is utilized to reactivate the absorbent or liquid hygroscopic medium of the system 26. To this end, a pipe 43 leading from the system 26 passes first in thermal contact with the compressed gases issuing from the compressor 34 in the heat exchanger 44 to remove some of the heat of compression generated in the compressor. Thereafter the solution may enter into the jacket 45 of the compressor where it may be further heated by the heat of compression. Thereafter it flows to the jacket or jackets 46 of the engine 30 where the liquid is further heated by the heat generated in transforming the fuel into other forms of energy in the combustion chamber 32 and the exhaust pipe 33 and from thence the liquid flows through the pipe 47 to the concentrator 48 where the liquid gives off its excess moisture to air flowing through the concentrator 48 and which moisture is discharged with the air through the air outlet 49.

The absorption system 26 delivers the concentrated solution from the sump 54 to contactor 28, preferably in a sufficiently cooled condition so that hygroscopic liquid removes all of the moisture desired from the air flowing by direct contact with the air. This is accomplished by providing an electrically driven pump 49a which delivers the hygroscopic liquid to a cooler 50 from whence it flows to a two-way valve 51. From thence the liquid may flow either through the pipe 52 to the contactor 28 or back through the by-pass pipe 53 to the sump 54 in which a main body of hygroscopic liquid 55 is maintained at the proper concentration. The cooler 50 may be cooled by any medium desired and, for example, it is preferably cooled by water entering through the pipe 56 and leaving through pipe 57 under control of a valve 58 which is governed by a thermostat 59 to maintain the substantially constant discharge temperature in the pipe 57. The control of the two-way valve 51 is made responsive to conditions of the air through the medium of a motor or diaphragm chamber 60 which is governed by a humidostat 61 in the enclosure 20. Thus conditions of the air, in this case the relative humidity, causes the solution flowing through the valve 51 to flow either to the contactor 28 or through the by-pass 53 directly back into the sump 54. The valve 51 may be such as to cause all of the liquid to flow in one or the other of the pipes 52 and 53, or it may merely change the ratio of the liquid flowing therethrough. The liquid flowing through contactor 28 returns through the pipe 62 to the sump 54.

The concentrator 48 is supplied with air taken through the intake 63, preferably outside the building, by a fan 64 driven by motor 65 which may conveniently also drive the pump 66 which causes the flow of liquid through the pipe 43 hereinbefore described.

The controls of the system are such that the air may have varying thermal effects imposed upon it by the system 27 and may have varying drying effects imposed upon it by the system 26, and, if the waste energy or heat furnished the apparatus by the system 27 is insufficient to maintain the solution at 55 properly concentrated, it may be supplemented in such a manner as to render the refrigerating and absorbing powers of the apparatus entirely independent of each other. This may be accomplished by providing a supplemental heater 67 in the line 47 which may heat the liquid going to the concentrator 48 if insufficient heat is delivered thereto by the refrigerating system. Thus the gas burner 68 is governed by a valve 70 made responsive, through the medium of thermostat 71, to the temperature of the liquid leaving heater 67. A pilot 69 is provided to ignite the burner 68. The thermostat 71 is so calibrated that if insufficient heat is delivered to the liquid by the refrigerating system, then the burner 68 provides a supplementary heating action upon the liquid.

The waste heat from the refrigerating system and the internal combustion engine may be disposed of wholly or in part through the cooler 50 alone when the solution is sufficiently concentrated, or by the cooler 50 and the concentrator 48 together when the solution is to be concentrated.

The controls are such that when the dry bulb temperature rises above a predetermined limit, and thus closes the switch 40, the compression system 27 begins to operate and cool the air passing through the casing 21, simultaneously heating the liquid flowing to the concentrator 48. When the temperature in the enclosure 20 drops below a predetermined temperature, the thermostat opens the snap switch 40 and stops the operation of the refrigerating system. If, at this time, it is necessary to dry the air, the liquid passing through the pipe 47 is heated entirely by the burner 67 while the refrigerating system is idle.

The humidostat 61 operates so that when the relative humidity drops, and therefore no further, or not as much, drying action is required, then the motor 60 moves the valve 51 so that all or a greater amount of liquid merely flows through the by-pass 53 and thus stops or reduces the drying action in the contactor 28. Conversely, when the relative humidity in the enclosure 20 rises, then the motor 60 moves the valve 51 to decrease the flow of liquid through the pipe 53 or to stop it entirely, thus increasing the drying action of the contactor 28.

While the form of embodiment of the invention as herein disclosed, constitutes a preferred form, it is to be understood that other forms might be adopted, all coming within the scope of the claims which follow.

What is claimed is as follows:

1. An apparatus for conditioning a gas comprising a refrigerating system and an affinitive medium system including a circulating affinitive medium, means for contacting said gas and affinitive medium, said refrigerating system including a prime mover, compressor, condenser and evaporator, means for utilizing the heat of compression from said compressor and waste heat from said prime mover to reactivate said affinitive medium, and supplementary heat means for reactivating said affinitive medium.

2. An apparatus for conditioning a gas comprising a refrigerating system and an affinitive medium system including a circulating affinitive medium, means for contacting said gas and affinitive medium, said refrigerating system including a prime mover, compressor, condenser and evaporator, means for utilizing the heat of compression from said compressor and waste heat from said prime mover to reactivate said affinitive medium, supplementary heat means for reactivating said affinitive medium, and means rendering said supplementary heat means effective when the heat from said prime mover is ineffective to reactivate said affinitive medium.

3. The method of conditioning a gas which comprises contacting said gas with an affinitive medium and thermally exchanging heat between said gas and an expanding refrigerant, reliquefying said refrigerant thus expanded by the aid of the transformation of potential energy into rotary kinetic energy with the evolution of heat, and utilizing said heat to reactivate said absorbing medium.

4. In combination, a refrigerating system, an affinitive medium system, a prime mover for said refrigerating system, means for utilizing the waste heat from said prime mover to reactivate said affinitive medium, supplementary heat means for reactivating said affinitive medium, and means for rendering said supplementary heat means effective when the heat from said prime mover is ineffective to reactivate said affinitive medium.

5. An apparatus for conditioning air or the like comprising air-flow means, means for contacting air at said air-flow means with an affinitive medium, a refrigerating system including a refrigerant liquefying unit and a refrigerant evaporator in heat exchange relationship with air in said air-flow means, a prime mover for said refrigerant liquefying unit, means utilizing waste heat from said prime mover for reactivating said affinitive medium, and supplementary heat means for reactivating said affinitive medium operative when said waste heat is insufficient to reactivate said affinitive medium.

6. An apparatus for conditioning air or the like comprising air-flow means, means circulating a liquid hygroscopic medium between said air-flow means and a reactivating zone, a refrigerating system including a compressor, condenser and evaporator in refrigerant flow relationship, said evaporator being in heat exchange relationship with air being treated, an internal combustion engine drivingly connected to said compressor, means governing the operation of said compressor by said engine in accordance with a function of a psychrometric property of air, and means utilizing waste heat from said internal combustion engine for reactivating said medium in said reactivating zone.

7. An apparatus for conditioning air or the like comprising air-flow means, means circulating a liquid hygroscopic medium between said air-flow means and a reactivating zone, a refrigerating system including a compressor, condenser and evaporator in refrigerant flow relationship, said evaporator being in heat exchange relationship with air being treated, an internal combustion engine drivingly connected to said compressor, means governing the operation of said compressor by said engine in accordance with a function of a psychrometric property of air, means utilizing waste heat from said internal combustion engine for reactivating said medium in said reactivating zone, and supplementary heat means effective when said waste heat is insufficient to reactivate said medium.

HARRY F. SMITH.